Figure 1:
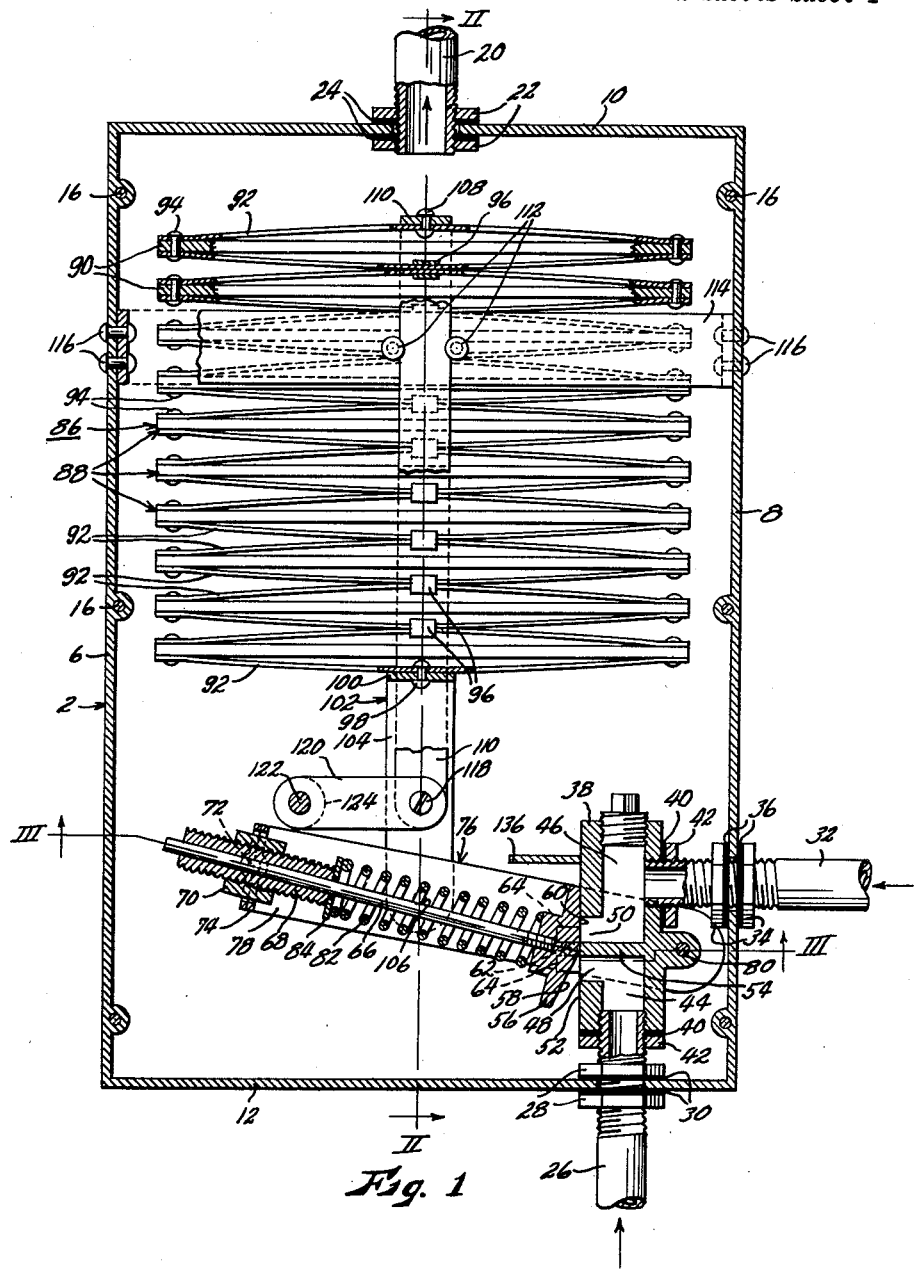

Dec. 11, 1962 W. C. RENNE 3,067,942
THERMOSTATIC MIXING VALVE
Filed Nov. 21, 1960 2 Sheets-Sheet 1

INVENTOR.
William C. Renne
BY
John A. Hamilton
Attorney.

Dec. 11, 1962

W. C. RENNE 3,067,942

THERMOSTATIC MIXING VALVE

Filed Nov. 21, 1960

2 Sheets-Sheet 2

INVENTOR.
William C. Renne
BY
John A. Hamilton
Attorney.

United States Patent Office 3,067,942
Patented Dec. 11, 1962

3,067,942
THERMOSTATIC MIXING VALVE
William C. Renne, 901 W. 87th St., Kansas City, Mo.
Filed Nov. 21, 1960, Ser. No. 70,704
3 Claims. (Cl. 236—12)

This invention relates to new and useful improvements in thermostatic mixing valves such as are commonly used for shower baths and the like, and has as its principal object the provision of a thermostatic mixing valve having novel features providing for the delivery of a mixture of hot and cold water of uniform temperature throughout the full range of temperatures between the temperatures of the hot and cold water supplies.

More specifically, my invention relates to means for overcoming the inaccuracies of temperature control introduced by variations of water pressure, both the variations in the supply pressures of the hot and cold water, and the variations of pressure introduced by the operation of the valve itself. Thermostatic mixing valves comprise in general a housing having hot and cold water inlets, and a closure member positioned to control said outlets and movable by a thermostatic element positioned in said housing to proportion the flow of water through the two inlets. Valves of this type have been subject to a serious degree of inaccuracy of temperature control when the supply pressures vary due to variations in demand for water in other parts of the system. For example, if the hot water supply pressure should drop, the cold water inlet must be correspondingly throttled to maintain a uniform delivery temperature, by movement of the closure member, and this movement must be made against the cold water pressure with less assistance from the hot water pressure on the opposing face of the closure than would be furnished if the hot water supply pressure had not dropped, but merely its temperature. Thus a greater motive force is required from the thermostatic element to compensate for pressure variations than is required to compensate for temperature variations. Since thermostatic elements are inherently yieldable, and can at a given setting deliver only a uniform motive force at a given water temperature, variations in the supply pressures have heretofore resulted in substantial inaccuracy of the temperature control. Moreover, even if the supply pressures remain constant, pressure differences are introduced if the closure member is called upon to throttle one or the other of the inlets more or less severely. That is, as the closure member moves toward a closing relation with either inlet, the force required to move said closure member still further gradually increases. The resistance of the fluid to movement of valve member closing against fluid pressure is greatest just before closure. This type of variation of operating force required to move the closure member results in loss of sensitivity of control, particularly in the end zones of the temperature range, which require severe throttling of one or the other of the inlets.

Generally, my invention contemplates the insertion between the thermostatic element and the closure member of a force-multiplying linkage for increasing the motive force delivered to the closure member. In this manner, variations of the force required to move the closure member constitute smaller proportions of the motive force delivered thereto, and will have much less tendency to cause inaccuracy of temperature control.

My invention also contemplates the use of a linkage as described wherein the mechanical advantage thereof gradually increases as the closure member approaches either of the inlets more closely and the force required to move said closure member consequently increases. In this manner, the force required to move said closure member is still more closely balanced with the force available to move it, and still greater accuracy and uniformity of control is made possible.

Another object is the provision of a thermostatic element specially constructed to supply great expansive force and to be relatively rigid at any position, to have sufficient movement to provide good sensitivity, and to have extremely rapid response to variations of water temperature.

Other objects are simplicity and economy of construction, efficiency and dependability of operation, and lack of necessity for frequent servicing.

Figure 2:
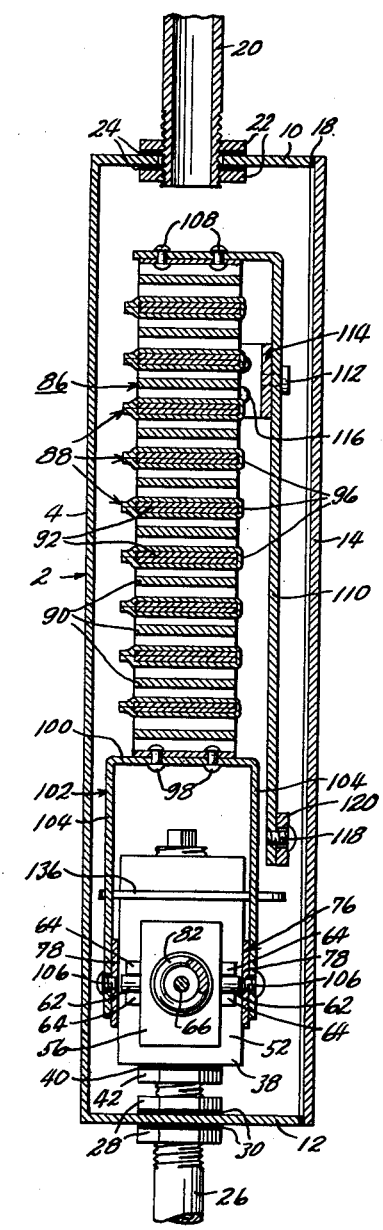
Figure 3:
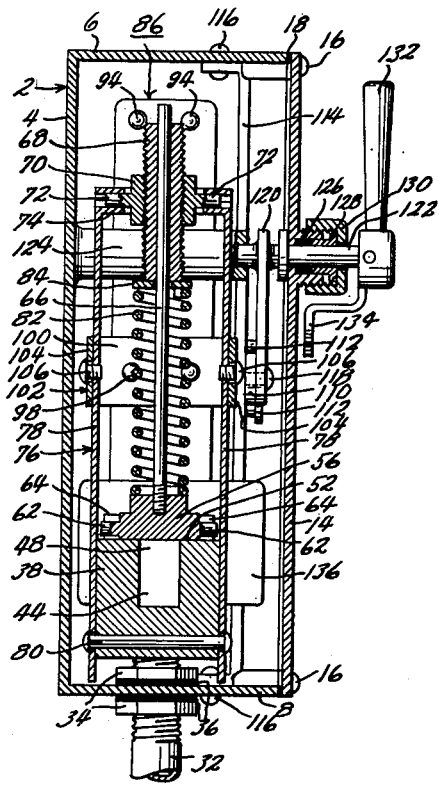

With these objects in mind, as well as other objects which will appear in the course of the specification, reference will be had to the drawing, wherein:

FIG. 1 is a vertical sectional view of a thermostatic mixing valve embodying the present invention, with parts left in elevation and parts broken away, and FIGS. 2 and 3 are sectional views taken respectively on lines II—II and III—III of FIG. 1, with the closure member in its neutral position.

Like reference numerals apply to similar parts throughout the several views, and the numeral 2 applies generally to the housing of the valve, said housing being rectilinear as shown and having a back wall 4, side walls 6 and 8, top wall 10, bottom wall 12, and a front cover 14 secured releasably thereto by screws 16 and sealed by gasket 18. Said housing is provided with an outlet pipe 20 sealed in top wall 10 by nuts 22 and gaskets 24, a hot water inlet pipe 26 sealed in bottom wall 12 by nuts 28 and gaskets 30, and a cold water inlet pipe 32 sealed in side wall 8 by nuts 34 and gaskets 36. Said inlet pipes extend into housing 2, where they are threaded into a valve body 38. The connection of each pipe into said valve body is sealed by a gasket 40 and a lock nut 42. Inlet pipes 26 and 32 thus support the valve body within the housing, and communicate respectively with hot and cold water chambers 44 and 46 of said valve body. Said hot and cold water chambers are provided respectively with outlets 48 and 50 which open in side-by-side relation through a planar face 52 of said valve body, said outlet openings being separated by a partition wall 54 of said valve body.

Valve body outlets 48 and 50 are controlled by a valve closure member 56 disposed adjacent face 52 of the valve body. Said closure member constitutes a block provided, on the side thereof confronting the valve body, with a pair of planar faces 58 and 60 disposed at an obtuse angle to each other, the ridge or angle at the juncture of said faces resting against the outer edge of partition wall 54. Said block is provided with a pair of oppositely extending coaxial trunnions 62 which are horizontal, parallel to valve body face 52, and lie in the plane of partition wall 54. Said trunnions are each disposed between the parallel faces of a pair of posts 64 integral with or attached to valve body 38 and extending outwardly from face 52 thereof. Thus the closure block may not only be tilted about the axis of trunnions 62, but it may also move toward and from valve body face 52. It will be seen that as closure block 56 is tilted about trunnions 62 in one direction, face 58 thereof approaches face 52 in overlapping relation to hot water outlet 48, whereby to restrict said outlet and throttle the flow of water therethrough. Similarly, if the closure block is tilted in the opposite direction, face 60 thereof approaches face 52 in overlapping relation to cold water outlet 50, whereby to restrict and throttle said outlet. The closure block has a neutral position wherein the faces 58 and 60 thereof are disposed at equal angles to face 52 of the valve body, and in which the outlets 48 and 50 are equally open.

A rod-like stem member 66 is affixed in closure block 56 and extends outwardly therefrom, being disposed at right angles to trunnions 62 and in bisecting relation to the angle between faces 58 and 60 of the block. Adjacent its outer end, said stem extends slidably through an externally threaded sleeve 68. Said sleeve is in turn threaded in a nut 70. Said nut is provided with a pair of oppositely extending trunnions transverse to the axis of the nut, and said trunnions are journalled in the connecting or angled portion 74 of a U-shaped arm 76 on an axis parallel to trunnions 62. The side members 78 of said arm extend alongside opposite sides of stem 66 and are pivoted by pin 80 to the valve body 38. Pin 80 is disposed at the opposite side of the valve body from face 52 thereof, being parallel to trunnions 62 and 72 and lying in a plane containing said trunnions and stem 66 when closure block 56 is in its neutral position. A helical compression spring 82 surrounds stem 66, bearing at one end against closure block 56 and at its opposite end against a washer 84 slidable on the stem and abutting the inner end of sleeve 68.

Valve body 38, stem 66, arm 76 and related parts are all disposed in the lower portion of housing 2. Disposed in the upper portion of said housing is a thermostatic element indicated generally by the numeral 86 comprising a series of identical units 88. As best shown in FIGS. 1 and 2, each unit 88 comprises a straight, relatively heavy bar 90 of a material having a relatively low coefficient of thermal expansion, and a pair of relatively thin strips 92 of a material having a relatively high coefficient of thermal expansion. Said strips are substantially coextensive with said bar, being disposed at opposite sides of said bar, and having their extreme end portions rigidly secured to said bar as by rivets 94. Intermediate their ends, strips 92 are bowed resiliently away from the bar 90. Units 88 are assembled in a vertical stack so as to be horizontally coextensive, the adjacent strips 92 of each adjoining pair of units 88 being joined at their midpoints by any suitable means such as a clip 96. It will be readily apparent that as the temperature of the fluid medium surrounding the element is increased, strips 92 will bow outwardly from bars 90 to a greater degree, and the vertical height of the element will be increased. Correspondingly, the height of the element will be decreased when the temperature of the fluid medium is lowered.

The bottom strip 92 of the lowermost unit 88 is riveted at 98 to the connecting portion 100 of a U-shaped arm 102, the side members 104 of said arm extending downwardly and being pivoted respectively at their lower ends to the side members 78 of arm 76 by screws 106 which are coaxial and parallel to trunnions 62 and 72. The upper strip 92 of uppermost unit 88 is riveted at 108 to an elongated arm 110 which extends downwardly along the forward side of the thermostatic element. Arm 110 is supported intermediate its ends for vertical sliding movement, and a slight pivotal movement in a vertical plane, between a pair of headed pins 112 fixed in a cross bar 114 extending transversely across housing 2 and fixed at its ends to side walls 6 and 8 by rivets 116. At its lower end, arm 110 is pivoted as at 118 to the free end of a crank 120 which is affixed radially to a shaft 122 extending forwardly through cover 14. The inner end of said shaft is journalled in the forward end of a post 124 affixed to and extending forwardly from back wall 4 of the housing. Where said shaft extends through cover 14, said cover is provided with a packing ring 126 surrounding said shaft and compressed by a gland 128 and nut 130. Affixed to the outer end of said shaft is a handle 132 whereby said shaft and crank 120 may be turned. The position of the crank may be indicated by a pointer 134 affixed to the handle, which may be used in conjunction with a temperature scale, not shown, imprinted on the outer surface of cover 14.

In the operation of the valve, assume first that valve closure block is positioned as shown in FIG. 1, closing cold water outlet 50 and opening hot water inlet 48, and that handle 132 has been turned to call for a mixed water temperature intermediate the hot and cold water supply temperatures. Then, when water is supplied to inlets 26 and 32, as by opening shut-off valves, not shown, exterior to the mixing valve, hot water first flows through outlet 48 into the housing 2, and surrounds thermostatic element 86 in its passage to outlet 20, heating said element and causing it to expand downwardly. It will be understood that packing 126 of shaft 122 exerts a sufficient frictional brake on said shaft to prevent its turning except by manual force applied thereto, whereby arm 110 supports the weight of the thermostatic element, and resists bodily movement of said element due to pressure exerted thereon by water pressure on closure block 56. As the thermostatic element expands downwardly, it acts through arm 102, pivot 106, arm 76, pivot 72 and stem 66 to pivot closure block 56 downwardly about trunnions 62, thereby opening cold water outlet 50 and allowing cold water to enter the housing to mix with the hot water. This reduces the water temperature in the housing, and causes contraction of the thermostatic element. This process of adjustment is continued until a condition of equilibrium is reached in which closure member 56 is held stationary. Thereafter any change of water temperature in the housing will cause expansion or contraction of the thermostatic element to readjust the position of the closure member to re-proportion the hot and cold water supplies to bring the temperature back to the desired level. It will be noted that valve body 38 is provided with a baffle plate 136 to prevent water emerging from cold water outlet 50 from impinging directly against the thermostatic element. Any suitable number and arrangement of baffles may be used to insure thorough intermixture of the hot and cold water before it traverses the thermostatic element. The temperature of the mixed water may be adjusted at any time by turning handle 132.

Relative to the particular features of the present invention, particular attention is directed first to the toggle linkage consisting of arm 76 and stem 66. When valve closure block 56 is in its neutral position, said arm and stem are in axial alignment with each other, and spring 82 exerts no force, tending to rotate stem 66 and block 56 in either direction about trunnions 62. This is the dead-center position of the toggle. However, when arm 76 is pivoted either upwardly or downwardly from said dead-center position by the thermostatic element, arm 76 and stem 66 pass out of alignment, and spring 82 exerts a force tending to move the stem still farther in the direction of its original movement. Moreover, the component of the spring force tending to turn the stem about trunnions 62 becomes greater the farther it is turned. Thus it will be seen that not only does the spring-loaded toggle linkage supplement the motive force of the thermostatic element and thus tend to render the adjustment of the closure block independent of variable water pressures on its faces, but also the supplemental force delivered by said toggle linkage is called into play only as and when it is needed. That is, the added force for adjusting the position of the closure block is required principally only when one or the other of the outlets 48 and 50 must be restricted or throttled, and generally in the same proportion as the degree of restriction required. The toggle linkage shown adds a supplemental force to that applied by the thermostatic element in proportion to the degree which either of the outlets must be throttled. In this manner, the closure block may be adjusted throughout its entire movement by the uniform pressure inherently delivered by the thermostatic element, despite the fact that the closure block may require different forces to move it in different portions of its total movement, or as a result of variable supply pressures. This has been thoroughly tested and found to produce a much more sensitive, accurate, and uniform temperature control over the entire temperature range than has heretofore been possible, especially in household usages where the supply pressures of the hot and cold water are subject to rapid and substantial variations.

Also, the specific thermostatic element shown is believed to possess definite advantages. Since it comprises a series of units each having only a slight movement, each unit may be much more strongly and rigidly constructed than could be single bi-metallic element if said single element where required to supply the entire movement. Thus the element shown is inherently rugged and capable of delivering a great force, so as to render the valve still more independent of pressure variations. The units can be assembled in any desired number, whereby to supply any desired degree of movement and hence any desired degree of sensitivity. The bars and strips all have both faces thereof completely exposed to the water, so as to respond extremely rapidly to temperature changes, whereby to lessen even momentary alterations of temperature changes of the mixed water due to changes of water supply temperatures or pressures.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A thermostatic mixing valve comprising a housing having an outlet for mixed hot and cold water and inlets for hot and cold water, a valve body mounted in said housing having hot and cold water inlets connected respectively to said housing inlets and a pair of outlet openings through which hot and cold water respectively may pass from said valve body into said housing, said outlets opening through a planar face of said valve body in side-by-side relation with a partition wall of said valve body therebetween, a valve closure block having a pair of angularly related planar faces with the ridge thereof intermediate said faces resting against said partition, said block being pivoted to said valve body on an axis parallel to said ridge, whereby as said block is pivoted respectively in opposite directions said planar faces thereof approach the planar surface of said valve body in overlapping relation to said valve body outlets, said block having a neutral position wherein the planar faces thereof are disposed at equal angles to said valve body face, a stem secured in said block and extending outwardly therefrom in bisecting relation to the angle between the planar faces thereof, an arm pivoted to said valve body on an axis parallel to but spaced apart from said block axis and lying in a plane including said stem when said block is in its neutral position, said arm extending alongside said stem and having an angled portion through which said stem extends at a point remote from said block, said stem being longitudinally slidable relative to said arm and pivotal relative thereto about an axis parallel to said block and arm axes, a compression spring bearing at one end against said block and at its opposite end against said arm, and a thermostatic element disposed in said housing, having one end secured to said housing and its other end attached to said arm, whereby as said element changes length responsively to temperature changes of water in said housing, said arm will be pivoted.

2. A thermostatic mixing valve as recited in claim 1 wherein said valve closure block is provided with a pair of pivot trunnions supported in elongated slots of said valve body for movement toward and from the planar face of said valve body, whereby said spring functions additionally to urge said block against said valve body.

3. A thermostatic mixing valve as recited in claim 1 with the addition of a threaded nut pivoted in the angled portion of said arm for movement on an axis transverse to the thread axis thereof and parallel to the axes of the block and arm, and a tubular sleeve threaded in said nut, said stem extending slidably through said sleeve, and said spring bearing against the inner end of said sleeve.

References Cited in the file of this patent

UNITED STATES PATENTS

| | | |
|---|---|---|
| 1,777,000 | Kasser | Sept. 30, 1930 |
| 2,193,588 | Galloway | Mar. 12, 1940 |
| 2,287,294 | Coile | June 23, 1942 |
| 2,296,917 | Garrett | Sept. 29, 1942 |
| 2,305,429 | Johnson | Dec. 15, 1942 |
| 2,681,566 | Ruge | June 22, 1954 |
| 2,708,551 | Record | May 17, 1955 |

FOREIGN PATENTS

| | | |
|---|---|---|
| 20,044 | Switzerland | Sept. 11, 1899 |
| 186,883 | Austria | Sept. 25, 1956 |